3,332,887
CATALYST FOR THE PRODUCTION OF OLEFINIC OXIDES
Harry Endler, Ferrara, Italy, assignor to Montecatini Edison S.p.A., a corporation of Italy
No Drawing. Filed Mar. 18, 1963, Ser. No. 266,060
Claims priority, application Italy, Mar. 21, 1962, 5,505/62
8 Claims. (Cl. 252—443)

My invention relates to the production of olefinic oxides and to the preparation of a silver-based catalyst for the catalytic oxidation of olefins to form olefinic oxides, particularly for the oxidation of ethylene to form ethylene oxide.

My invention has as an object, the preparation of an improved silver-based catalyst and the use thereof in the catalytic oxidation of olefins. It is known from Endler et al. Patent No. 2,825,701 of Mar. 4, 1958, that olefinic oxides, particularly ethylene oxide, may be prepared by reacting the olefin with oxygen or oxygen-containing gases in the presence of a silver-based catalyst, obtained by the coprecipitation of silver carbonate and alkaline-earth carbonates from solutions of the corresponding salts.

It is also known that besides the ethylene oxide product obtained from a partial oxidation of ethylene, a portion of the oxidation goes to completion, resulting in large amounts of carbon dioxide and water as well as other secondary reaction products such as acetic aldehyde, etc.

It is also known that the process can be improved by adding to the catalyst a halogenated substance to increase the selectivity of the catalyst towards ethylene oxidation to ethylene oxide and thereby reducing the conversion of ethylene to undesired products. The incorporation of halogens into the silver catalyst increases the catalytic activity toward oxide formation and improves the yield through lower ethylene consumption.

It has been generally observed that the reaction temperature when using such catalyst tends to shift to higher values when high gas flow rates are employed. It has been found in industrial practice that when carrying out prolonged runs, the specific output of a catalyst, at constant temperature, gradually decreases, thereby requiring progressive increases in reaction temperature in order to maintain constant olefin oxide production. The loss of activity of a catalyst is much more rapid at higher temperatures. After reaching a certain temperature maximum, the catalyst becomes completely exhausted thereby requiring the catalyst to be changed. It follows from the above, that a catalyst for industrial use will have greater duration and produce greater yields as the operating temperature, for acceptable quantities of ethylene oxide, is lowered. It is known that the reaction temperature can be lowered by adding to the silver catalyst, barium or beryllium compounds which act as co-activators.

I have found, and this is an object of my invention, that the presence of zinc and/or cadmium in the form of neutral or basic carbonates together with the alkaline-earth carbonates in the silver-based catalyst increases the catalytic activity to the extent that other conditions being equal, the same or better yields are obtained in the oxidation reaction of olefins, at temperatures lower than previously employed with silver-carbonate catalysts. Particularly efficient catalysts are obtained by coprecipitation of the carbonates of silver and alkaline-earth metals from aqueous solutions of corresponding salts when said solutions also contain specific amounts of a zinc and/or cadmium salt. The zinc and/or cadmium may also be coprecipitated in the form of basic carbonates.

In the case of zinc, the carbonate composition may be expressed by the formula $$[ZnO]_x[CO_2]_y[H_2O]_z$$

wherein $x$, $y$, $z$ vary from 1 to 5, and the ratio $C_2O/ZnO$ does not exceed 1. The molar ratio of the coprecipitated carbonates is silver carbonate:alkaline-earth carbonate: carbonate selected from the group consisting of zinc and cadmium carbonates in values between 1:0.7:0.06 and 1:0.7:1 and preferably in values between 1:0.7:0.06 and 1:0.7:0.2. The catalyst powders, so prepared, may be utilized as such, e.g. pressed into tablets. It is preferable, however, that the catalyst is fixed on a suitable carrier, which may be inherently porous materials or may be porous by the particular method of artificial aggregation. Examples of such materials are quartz, refractory materials, such as "Alundum" and "Carborundum" (silicon carbide). The silicon carbide aggregates prove to be particularly suitable as porous spheres of 3–9 mm., preferably of 6–7 mm., diameter. These aggregates are made up of about 80% silicon carbide and about 20% aluminum and calcium silicates, which act as a binding medium. The aggregate has a porosity of 40 to 50% and an outer surface with a high degree of roughness.

Porous spheres of melted or sintered aluminum oxide, "Alundum," are also suitable. These spheres are within a 3–9 mm. diameter, have a porosity of 44 to 48% with pores from 50 to 200μ diameter. The powder is caused to adhere to the carrier according to common practice, by soaking the carrier in a suspension of the powder and causing the liquid portion of the suspension to evaporate. Surfactants, such as ethylene glycol and homologues thereof, promote the penetration of the powder into the pores of the carrier. The catalyst is fixed onto the carrier in an amount of 5 to 20 gr. of coprecipitate per 100 cc. of carrier and preferably 12 to 15 gr. of coprecipitate per 100 cc. of carrier. The catalyst grains, obtained in this manner, are heated, for example in a muffle furnace, at a temperature between 200 and 500° C. and preferably at about 400° C., to dissociate the silver carbonate to silver oxide and/or metallic silver. In this manner the catalytic powder uniformly coats the catalyst granules and is adherent thereto.

Catalysts, prepared in the foregoing manner, have the further advantage of possessing superior oxidation activity, particularly with respect to the ethylene oxide, at a reaction temperature below about 50° C. notwithstanding the high gas flow rates which correspond to a spatial velocity of 4000 to 7000 hr.$^{-1}$.

The low reaction temperature and the high productivity of the catalyst are surprising, since the silver content per unit volume of the finished catalyst is relatively low compared to that of the other catalysts. In fact, as is seen in the specific examples, by using the catalyst of the present invention it is possible to obtain an ethylene oxide output of 0.93 kg. per hour per kg. of silver contained in the catalyst. As a result thereof, not only is the catalyst life greater but there is also the economic advantage of having less capital in the catalyst in form of silver used for the process.

The examples compare the activities of catalysts prepared by coprecipitation of silver carbonates and alkaline-earth metal carbonates with catalysts prepared according to the present invention and containing zinc and cadmium carbonates as co-activators. The tests, which reproduce conditions of ethylene oxide industrial synthesis, are carried out by feeding, to the reactor containing the catalyst, a gas mixture made up of carbon dioxide, ethylene, oxygen, nitrogen and argon as is obtained by recycling a portion of the reaction gas, freed from ethylene oxide, to which make-up quantities of ethylene and air have been added.

In the examples reported hereinbelow, Examples 1 and 2 show conventional techniques. By the term "conversion," the ratio between moles of formed ethylene oxide and moles of fresh ethylene fed and expressed as percent, is understood. The term "yield" or "selectivity" is understood to be the ratio between the number of moles of formed oxide and the total number of moles of ethylene converted to any product. The term "transformation" is understood to mean the relationship between the moles of ethylene consumed in the reaction and the moles of fresh ethylene fed. By "space velocity" is meant the number of volumes of gas, measured at atmospheric pressure and steady temperature, which pass at a given time through a catalyst bed of given volume.

*Example 1*

80 gr. (grams) of silver nitrite and 38 gr. of calcium nitrate with 4 moles of water of crystallization are dissolved in 1200 cc. of water. This solution has an opalescent appearance due to the presence of chlorides in the alkaline-earth nitrates. An adsorbent substance, e.g. filtering charcoal, is added. The mixture is then stirred and filtered. At the same time, a 10% solution containing 42.1 gr. of sodium carbonate in water is prepared. This solution is purified by adding 1 gr. of silver nitrate and subsequently filtering off the resulting silver carbonate precipitate, which contains the impurities present in the starting carbonate. Prior to coprecipitating the silver and calcium carbonates, 24 cc. of an aqueous solution of calcium chloride (1 gr./1. conc.) are added to the nitrate solution.

The carbonates are coprecipitated by dropping the sodium carbonate solution onto the nitrates solution. Thereafter the precipitate is filtered off, washed and dried at 108° C. 80 gr. of catalyst powder are obtained, of which 14 gr. are placed into a glazed porcelain dish and mixed into a suspension with an aqueous 30% solution of ethylene glycol and 100 cc. of porous "Carborundum" aggregates of 7 mm. average diameter. The mixture is evaporated to dryness on a water bath, while stirring. The catalyst granules, thus prepared, are heated in a muffle oven at 400° C. for one hour.

100 cc. of the catalyst are introduced into a reactor, consisting of a glass pipe of 16 mm. inner diameter, and immersed in a thermostatic bath maintained at 225° C. A gas mixture of: 3.5–3.8% ethylene, 7.5–8% oxygen, 7% carbon dioxide, as is obtained by recycling 405 l./hr. of reaction gas, freed from the oxide produced, and mixing with 1.47 l./hr. of fresh ethylene and 9.75 l./hr. air is passed over the catalyst. A flow rate of 416 l./hr. is maintained. This corresponds to a space velocity of 4160 hr.$^{-1}$.

The ethylene oxide content at the reactor outlet is 0.232 volume percent, which corresponds to an ethylene oxide output of 1913 mg./hr., a conversion of 65.7%, a yield of 82.2% and a transformation of 79.9%.

When feeding this gas mixture, obtained by recycling 370 l./hr. of reaction gas, freed from the oxide produced, and mixed with 5.5 l./hr. of fresh ethylene and 39.4 l./hr. of air at the space velocity of 4100 hr.$^{-1}$ and at the temperature of 275° C., the ethylene oxide content at the reactor outlet is 0.683 volume percent. This corresponds to an output of 5485 mg./hr., a conversion of 50.5%, a yield of 62.7% and a transformation of 80.5%.

*Example 2*

80 gr. of silver nitrate, 38 gr. of calcium nitrate, crystallized with 4 moles of water, and 8.4 gr. of barium nitrate are dissolved in 1200 cc. of water. This solution shows sometimes an opalescent appearance due to the presence of chloride in the alkaline-earth nitrates. An adsorbent substance is added. The mixture is then stirred and filtered. At the same time, a 10% aqueous solution containing 45.6 gr. of sodium carbonate, which is purified by adding 1 gr. silver nitrate thereto and subsequently filtering off the resulting silver carbonate precipitate containing trace impurities in the starting carbonate, is prepared. Prior to coprecipitating the silver, calcium and barium carbonates, 24 cc. of an aqueous calcium chloride solution (1 gr./1. conc.) are added. After the coprecipitation of the carbonate, which is carried out by dropwise adding the sodium carbonate solution to the nitrate solution, the precipitate is filtered off, washed and dried in an oven at 108° C. 83 gr. of catalyst powder are obtained. 14 gr. of the catalyst powder are suspended in a 30% aqueous solution of ethylene glycol and soaked on 100 cc. of porous "Carborundum" aggregates of 7 mm. average diameter in a glazed porcelain dish. The catalytic powder is soaked onto the catalyst, by evaporating the mixture to dryness on a water bath while stirring. The catalyst granules, thus prepared, are heated in a muffle furnace at 400° C. for one hour.

100 cc. catalyst are introduced into a reactor, made up of a glass pipe of 16 mm. diameter, and immersed in a thermostatic bath maintained at 225° C. A gas mixture containing: 3.5–3.8% ethylene, 7.5–8% oxygen and 7% carbon dioxide (the remainder being inert) and as obtained by recycling 362 l./hr. reaction gas, freed from the oxide produced, and mixed with 5.2 l./hr. fresh ethylene and 47.0 l./hr. of air is passed over the catalyst. The flow rate is 415 l./hr., which corresponds to a space velocity of 4150 hrs.$^{-1}$. The ethylene oxide content at the reactor outlet is 0.533 volume percent, which corresponds to an ethylene oxide output of 4380 mg./hr., a conversion of 42.5%, a yield of 49.2% and a transformation of 86.4%.

*Example 3*

80 gr. of silver nitrate, 38 gr. of calcium nitrate with 4 moles of water of crystallization and 9.6 gr. of zinc nitrate with 6 moles of water of crystallization are dissolved in 1200 cc. of water and purified as in the preceding examples.

At the same time, a 10% solution containing 45.6 gr. of sodium carbonate in water is prepared. This solution is purified by adding thereto 1 gr. of silver nitrate and subsequently filtering off the precipitate. Prior to coprecipitating the silver, calcium and zinc carbonates, 20 cc. of an aqueous solution of calcium chloride (1 gr./1. concentration) are added. The carbonates are coprecipitated by dropwise adding the sodium carbonate solution to the nitrate solution. Thereafter, the precipitate is filtered, washed and dried in an oven at 108° C. 81 gr. of catalyst powder are obtained, of which 14 gr. are placed in a glazed porcelain dish and mixed into a suspension with an aqueous 30% solution of ethylene glycol and 100 cc. of porous "Carborundum" aggregates having an average diameter of 7 mm. The catalyst powder is soaked onto the aggregates by evaporating the mixture to dryness on a water bath while stirring. The so prepared catalyst granules are heated in a muffle furnace at 400° C. for one hour. 100 cc. of catalyst are introduced into a reactor, made up of a glass pipe of 16 mm. inner diameter, and immersed in a thermostatic bath kept at 225° C. A gas mixture of: 3.5–3.8% ethylene, 7.5–8% oxygen, 7% carbon dioxide (the remainder being inert) as obtained by recycling 359 l./hr. reaction gas, freed from the oxide produced, and mixing therewith 7 l./hr. fresh ethylene and 54.9 l./hr. air, is passed over the catalyst. A flow rate of 420.9 l./hr. is maintained. This corresponds to a space velocity of 4209 hr.$^{-1}$. The ethylene oxide content at the reactor outlet is 0.786 volume percent which corresponds to an ethylene oxide output of 6390 mg./hr., a conversion of 46.2%, a yield of 54.2% and a transformation of 85.3%.

When using the same gas mixture as a feed as obtained by recycling 557 l./hr. of reaction gas freed from the oxide produced, and mixed with 7.7 l./hr. fresh ethylene and 71.5 l./hr. air at a space velocity of 6360 hr.$^{-1}$ and a temperature of 225° C., the ethylene oxide content at the reactor outlet is 0.609 volume percent.

This corresponds to an output of 7504 mg./hr., a conversion of 49.2%, a yield of 54.3% and a transformation of 90.6%.

Example 4

80 gr. of silver nitrate, 38 gr. of calcium nitrate with 4 moles of water of crystallization and 14.4 gr. of zinc nitrate with 6 moles of water of crystallization are dissolved in 1200 cc. water. The carbonates are coprecipitated in the manner described in Example 3 with a purified 10% aqueous solution of 47.3 gr. sodium carbonate. Prior to co-precipitating the silver, calcium and zinc carbonates, 24 cc. of an aqueous solution of calcium chloride (1 gr./l. concentration) are added. The precipitate is filtered off, washed and dried in an oven at 108° C.

83 gr. of catalyst powder are obtained, of which 14 gr. are placed in a glazed porcelain dish and mixed into a suspension with an aqueous 30% solution of ethylene glycol and 100 cc. of porous "Carborundum" aggregates of 7 mm. average diameter, as described in Example 3. The catalyst granules thus prepared, are heated in a muffle furnace at 400° C., for one hour.

100 cc. of the catalyst are introduced into a reactor, made up of a glass pipe with 16 mm. inner diameter, and immersed in a thermostatic bath kept at 225° C. A gas mixture of: 3.5–3.8% ethylene, 7.5–8% oxygen, 7% carbon dioxide (the remainder being inert) as obtained by recycling 549 l./hr. reaction gas, freed from the oxide produced, and mixing therewith 7.5 l./hr. fresh ethylene and 74.2 l./hr. air is passed over the catalyst. The flow rate is 630.7 l./hr. which corresponds to a space velocity of 6307 hr.$^{-1}$.

The ethylene oxide content at reactor outlet is 0.503 volume percent, which corresponds to an ethylene oxide output of 6283 mg./hr., a conversion of 42.1%, a yield of 47.8% and a transformation of 88.2%.

Example 5

From a solution of 80 gr. of silver nitrate, 38 gr. of calcium nitrate with 4 moles of water of crystallization and 14.9 gr. cadmium nitrate with 4 moles of water of crystallization in 1200 cc. water, the carbonates are precipitated (as described in Example 3) with a purified 10% aqueous solution of 47.3 gr. of sodium carbonate. Prior to coprecipitating the silver, calcium and cadmium carbonates, 24 cc. of a water solution of calcium chloride (1 gr./l. concentration) are added. The precipitate is filtered, washed and dried in an oven at 108° C.

86 gr. of catalytic powder are obtained of which 14 gr. are suspended in a 30% aqueous solution of ethylene glycol and 100 cc. porous aggregates of "Carborundum" having 7 mm. average diameter as described in Example 3. The catalyst granules thus prepared, are heated in a muffle furnace at 400° C. for one hour.

100 cc. of catalyst are introduced into a reactor, made up of a glass pipe with 16 mm. inner diameter, and immersed in a thermostatic bath kept at 225° C. A gas mixture of: 3.5–3.8% ethylene, 7.5–8% oxygen, 7% carbon dioxide (the remainder being inert) as obtained by recycling 372 l./hr. reaction gas, freed from the oxide produced, and mixing therewith 6.6 l./hr. fresh ethylene and 51 l./hr. air is passed over the catalyst. The flow rate is 429.6 l./hr., corresponding to a space velocity of 4296 hr.$^{-1}$.

The ethylene oxide content at the reactor outlet is 0.736 volume percent, which corresponds to an ethylene oxide output of 6121 mg./hr., a conversion of 46.8%, a yield of 54.5% and a transformation of 85.9%.

Example 6

From a solution of 80 gr. of silver nitrate, 38 gr. of calcium nitrate with 4 moles of water of crystallization and 9.92 gr. cadmium nitrate with 4 moles of water of crystallization dissolved in 1200 cc. of water, the carbonates are coprecipitated as in Example 3 with a purified 10% aqueous solution of 45.6 gr. of sodium carbonate. Prior to coprecipitating the silver, calcium and cadmium carbonates, 24 cc. of an aqueous solution of calcium chloride (1 gr./l. concentration) are added. The precipitate is filtered, washed and dried in an oven at 108° C.

82.5 gr. of catalytic powder are obtained, of which 14 gr. are suspended in a 30% aqueous solution of ethylene glycol and soaked on 100 cc. porous aggregates of "Carborundum" having 7 mm. average diameter, as set forth in Example 3. The catalyst granules, thus prepared, are heated in a muffle furnace at 400° C. for one hour.

100 cc. catalyst are introduced into a reactor, constituted of a glass pipe with 16 mm. inner diameter, and immersed in a thermostatic bath kept at 225° C. A gas mixture of: 3.5–3.8% ethylene, 7.5–8% oxygen, 7% carbon dioxide (the remainder being inert), as obtained by recycling 458 l./hr. reaction gas, freed from the oxide produced, and mixing with said reaction gas 7.3 l./hr. fresh ethylene and 547 l./hr. air is passed over the catalyst. The flow rate is 520 l./hr., which corresponds to a space velocity of 5200 hr.$^{-1}$.

The ethylene oxide content at the reactor outlet is 0.675 volume percent, which corresponds to an ethylene oxide output of 6968 mg./hr., a conversion of 47.1%, a yield of 57% and a transformation of 82.7%.

Example 7

80 gr. silver nitrate, 38 gr. calcium nitrate with 4 moles of water of crystallization and 9.6 gr. zinc nitrate with 6 moles of water of crystallization are dissolved in 1200 cc. of water and purified as in the preceding examples.

At the same time a 10% solution of 45.6 gr. of sodium carbonate in water is prepared, which solution is purified by adding thereto 1 gr. silver nitrate and filtering off the resulting precipitate. Prior to coprecipitating the silver, calcium and zinc carbonates, 24 cc. of an aqueous solution of calcium chloride (1 gr./l. concentration) are added. The carbonate coprecipitation is performed by dropping the sodium carbonate solution onto the nitrate solution. The precipitate is filtered off, washed and dried in an oven at 108° C.

81 gr. of catalyst powder are obtained, of which 14 gr. are suspended in a 30% aqueous solution of ethylene glycol and soaked on 100 cc. of spheres of melted or sintered aluminum oxide of 8–9.5 mm. diameter, porosity between 44 and 48% and with a diameter of the holes between 50 and 200$\mu$, in a glazed porcelain dish, by evaporation to dryness of said mixture on a water bath under stirring. The catalyst granules thus prepared, are heated in a muffle furnace at 400° C. for one hour.

100 cc. of catalyst are introduced into a reactor, made up of a glass pipe of 16 mm. inner diameter, and immersed in a thermostatic bath kept at 220° C. A gas mixture of: 3.5–3.8% ethylene, 7.5–8% oxygen, 7% carbon dioxide (the remainder being inert), as obtained by recycling 536 l./hr. reaction gas, freed from the produced oxide, and mixing therewith 7.7 l./hr. fresh ethylene and 64.3 l./hr. air is passed over the catalyst at a flow rate of 608 l./hr., which corresponds to a space velocity of 6080 hr.$^{-1}$.

The ethylene oxide content at the reactor outlet is 0.60 volume percent, which corresponds to an ethylene oxide output of 7210 mg./hr., a conversion of 47.0%, a yield of 54.3% and a transformation of 86.8%.

Obviously many modifications and variations of the present invention are possible in the light of the above teachings. It is therefore to be understood that within the scope of the appended claims, the invention may be practiced otherwise than as specifically described.

I claim:

1. A process for preparing a silver catalyst suitable for the catalytic oxidation of olefins, which comprises coprecipitating a mixture of carbonates from an aqueous solution of a silver salt, an alkaline-earth salt and a salt selected from the group consisting of zinc and cadmium salts, fixing the coprecipitate on a granular, porous refractory carrier, and thereafter decomposing the coprecipitate by heating.

2. The process of claim 1, wherein the aqueous salt solution contains from 0.05 to 0.5 gr./equivalents of chlorine per 100 gr./atoms of silver.

3. A process for preparing a silver catalyst suitable for the catalytic oxidation of olefins, which comprises coprecipitating a mixture of carbonates from an aqueous solution of a silver salt, an alkaline-earth salt and a zinc salt, the zinc carbonate corresponding to the formula $$[ZnO]_x[CO_2]_y[H_2O]_z$$

wherein $x$, $y$ and $z$ are from 1 to 5 and $x/y$ does not exceed 1, fixing the coprecipitate on a granular, porous refractory carrier, and thereafter decomposing the coprecipitate by heating.

4. A process for preparing a silver catalyst suitable for the catalytic oxidation of olefins, which comprises coprecipitating a mixture of carbonates from an aqueous solution of a silver salt, an alkaline-earth salt and a salt selected from the group consisting of zinc and cadmium salts, suspending the coprecipitate and a granular, porous refractory carrier in an aqueous ethylene glycol solution, evaporating said glycol solution to dryness, thereby fixing the coprecipitate on the carrier, and thereafter heating the carrier to a temperature between 200 and 500° C. whereby the silver carbonate on the carrier dissociates.

5. A process for preparing a silver catalyst suitable for the catalytic oxidation of olefins, which comprises coprecipitating a mixture of carbonates from an aqueous solution of a silver nitrate, an alkaline-earth nitrate and a nitrate selected from the group consisting of zinc and cadmium nitrates and mixtures thereof, fixing the coprecipitate on a granular, porous refractory carrier, and thereafter decomposing the coprecipitate by heating.

6. A process for preparing a silver catalyst suitable for the catalytic oxidation of olefins, which comprises coprecipitating a mixture of carbonates from an aqueous solution of a silver salt, an alkaline-earth salt and a salt selected from the group consisting of zinc and cadmium salts; the molar ratio of the coprecipitated carbonates is silver carbonate:alkaline-earth carbonate:carbonate selected from the group consisting of zinc and cadmium carbonates in values between 1:0.7:0.06 and 1:0.7:1; fixing the coprecipitate on a granular, porous refractory carrier, and thereafter decomposing the coprecipitate by heating.

7. A process for preparing a silver catalyst suitable for the catalytic oxidation of olefins, which comprises coprecipitating a mixture of carbonates from an aqueous solution of a silver salt, an alkaline-earth salt and a salt selected from the group consisting of zinc and cadmium salts; the molar ratio of the coprecipitated carbonates is silver carbonate:alkaline-earth carbonate:carbonate selected from the group consisting of zinc and cadmium carbonates in values between 1:0.7:0.06 and 1:0.7:0.2; and fixing the coprecipitate on a granular, porous refractory carrier in an amount from 5 to 20 grams of coprecipitate per 100 cc. of carrier.

8. A catalyst for the catalytic oxidation of olefins to olefin oxides, consisting of a porous refractory material selected from the group consisting of porous aggregates of silicium carbide containing aluminum silicate as binding medium, and porous aggregates of melted aluminum oxide, said material being spherical with a 3–9 mm. diameter and coated on the outer walls and on the pore walls with a finely subdivided catalytic powder consisting of a carbonate of an alkaline-earth metal, a carbonate selected from the group consisting of zinc and cadmium carbonates and mixtures thereof, decomposition products of silver carbonate and chlorine ions.

References Cited

UNITED STATES PATENTS

| | | | |
|---|---|---|---|
| 2,426,761 | 9/1947 | Cambron et al. | 252—443 |
| 2,765,283 | 10/1956 | Sacken | 252—463 |
| 2,825,701 | 3/1958 | Endler et al. | 252—443 |

OSCAR R. VERTIZ, *Primary Examiner.*

H. S. MILLER, *Assistant Examiner.*